United States Patent
Kim et al.

(10) Patent No.: US 10,805,934 B2
(45) Date of Patent: Oct. 13, 2020

(54) METHOD AND APPARATUS FOR WIRELESS COMMUNICATION CONSIDERING COLLISIONS AMONG DEVICE TO DEVICE TRANSMISSIONS

(71) Applicant: SAMSUNG ELECTRONICS CO., LTD., Suwon-si (KR)

(72) Inventors: Ki-hun Kim, Suwon-si (KR); Min-ho Shin, Seoul (KR); Shi-chang Rho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/966,888

(22) Filed: Apr. 30, 2018

(65) Prior Publication Data
US 2019/0075566 A1 Mar. 7, 2019

(30) Foreign Application Priority Data
Sep. 7, 2017 (KR) .................. 10-2017-0114687

(51) Int. Cl.
| | | |
|---|---|---|
| *H04W 72/08* | (2009.01) | |
| *H04W 76/23* | (2018.01) | |
| *H04L 5/00* | (2006.01) | |
| *H04B 17/00* | (2015.01) | |
| *H04L 1/18* | (2006.01) | |
| *H04W 24/08* | (2009.01) | |
| *H04W 72/04* | (2009.01) | |

(52) U.S. Cl.
CPC ......... *H04W 72/082* (2013.01); *H04L 5/0053* (2013.01); *H04W 76/23* (2018.02); *H04B 17/00* (2013.01); *H04L 1/18* (2013.01); *H04W 24/08* (2013.01); *H04W 72/042* (2013.01)

(58) Field of Classification Search
CPC combination set(s) only.
See application file for complete search history.

(56) References Cited

U.S. PATENT DOCUMENTS

| | | |
|---|---|---|
| 8,316,270 B2 | 11/2012 | Chae et al. |
| 8,867,478 B2 | 10/2014 | Nayeb Nazar et al. |
| 9,444,586 B2 | 9/2016 | Vajapeyam et al. |
| 9,629,174 B2 | 4/2017 | Agiwal et al. |
| 2015/0215903 A1* | 7/2015 | Zhao ............... H04W 72/04 370/329 |
| 2015/0249544 A1 | 9/2015 | Cho |
| 2015/0326381 A1 | 11/2015 | Sakhnini et al. |
| 2016/0095133 A1 | 3/2016 | Hwang et al. |
| 2016/0373216 A1 | 12/2016 | Maaref et al. |
| 2017/0048905 A1 | 2/2017 | Yun et al. |
| 2017/0054540 A1* | 2/2017 | Kim ............... H04L 5/0048 |

(Continued)

*Primary Examiner* — Jason E Mattis
(74) *Attorney, Agent, or Firm* — Sughrue Mion, PLLC

(57) ABSTRACT

A wireless communication method such as a method for supporting a Device to Device (D2D) communication performed in a wireless communication system includes: receiving first and second control signals from first and second user terminals through first and second control channels, respectively; estimating an interference in a first data channel, corresponding to the first control signal or the first control channel, based on the first and the second control signals; receiving a first data signal from the first user terminal through the first data channel; and processing the received first data signal based on a result of the estimation.

13 Claims, 14 Drawing Sheets

(56) References Cited

U.S. PATENT DOCUMENTS

2018/0206211 A1* 7/2018 Seo .................. H04W 72/02
2018/0206260 A1* 7/2018 Khoryaev ......... H04W 72/1242
2019/0007974 A1* 1/2019 Nguyen ............ H04W 74/0825
2019/0075547 A1* 3/2019 Chae ................. H04W 4/40

* cited by examiner $$g'(qCHs) = \frac{qCH13}{qCH12} = \frac{\text{PSCCH Signal Power from UE3}}{\text{PSCCH Signal Power from UE2}}$$

FIG. 13

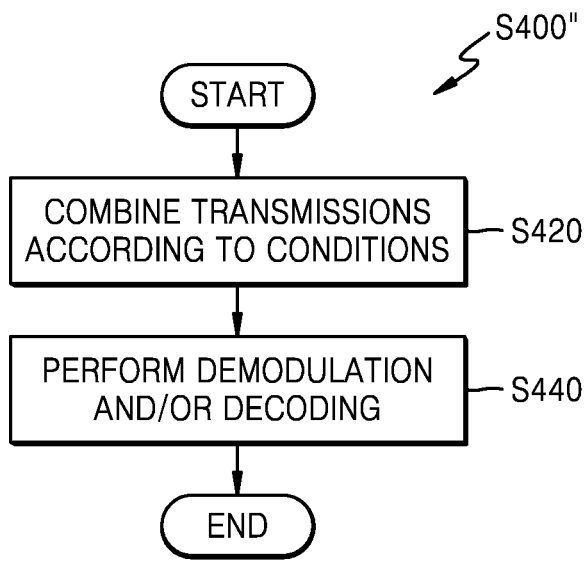

FIG. 14A

```
                                                                S420'
11   case (initial transmission) {
12       treat_as_new_transmission
13   }
14   case (1st or 2nd retransmission) {
15       if(is_non_infernece_exist_before) {
16           if(interference_detected) discard
17           else combining
18       }
19       else {
20           if(interference_detected) combining
21           else treat_as_new_transmission
22   }
23   case (3rd retransmission) {
24       if (is_non_interference_exist_before) combining
25       else {
26           if(interference_detected) combining
27           else treat_as_new_transmission
28       }
29   }
```

FIG. 14B

| Trial | Interference | | | | Group1 | Group2 |
|---|---|---|---|---|---|---|
| | TX0 | rTX1 | rTX2 | rTX3 | | |
| T01 | N | N | N | N | TX0, rTX1, rTX2, rTX3 | - |
| T02 | N | N | N | I | TX0, rTX1, rTX2, rTX3 | - |
| T03 | N | N | I | N | TX0, rTX1, rTX3 | - |
| T04 | N | N | I | I | TX0, rTX1, rTX3 | - |
| T05 | N | I | N | N | TX0, rTX2, rTX3 | - |
| T06 | N | I | N | I | TX0, rTX2, rTX3 | - |
| T07 | N | I | I | N | TX0, rTX3 | - |
| T08 | N | I | I | I | TX0, rTX3 | - |
| T09 | I | N | N | N | TX0 | rTX1, rTX2, rTX3 |
| T10 | I | N | N | I | TX0 | rTX1, rTX2, rTX3 |
| T11 | I | N | I | N | TX0 | rTX1, rTX3 |
| T12 | I | N | I | I | TX0 | rTX1, rTX3 |
| T13 | I | I | N | N | TX0, rTX1 | rTX2, rTX3 |
| T14 | I | I | N | I | TX0, rTX1 | rTX2, rTX3 |
| T15 | I | I | I | N | TX0, rTX1, rTX2 | rTX3 |
| T16 | I | I | I | I | TX0, rTX1, rTX2, rTX3 | - |

METHOD AND APPARATUS FOR WIRELESS COMMUNICATION CONSIDERING COLLISIONS AMONG DEVICE TO DEVICE TRANSMISSIONS

CROSS-REFERENCE TO THE RELATED APPLICATION

This application claims priority from Korean Patent Application No. 10-2017-0114687, filed on Sep. 7, 2017, in the Korean Intellectual Property Office, the disclosure of which is incorporated herein in its entirety by reference.

BACKGROUND

Methods and apparatuses consistent with the exemplary embodiment of the inventive concept relate to wireless communication, and more particularly, to wireless communication considering collisions among Device-to-Device (D2D) transmissions.

In a wireless communication system, a communication from a base station to a terminal may be referred to as a downlink (DL), and a communication from a terminal to a base station may be referred to as an uplink (UL). In addition to the DL and the UL, a communication from one terminal to another terminal in a wireless communication system may be referred to as a sidelink (SL). When two or more terminals generate D2D transmissions through an SL, interference in such D2D transmissions may occur. Such interference may cause problems in a terminal that receives D2D transmissions, and thus, an efficiency of a corresponding SL may degrade. Accordingly, a method of efficiently processing D2D transmissions, in which interference occurs, in a terminal and a method of decreasing interference in D2D transmissions are required.

SUMMARY

The exemplary embodiments of the inventive concept provide a method and apparatus for wireless communication to improve an efficiency of a communication between user terminals such as a Device-to-Device (D2D) communication in a wireless communication system.

According to an aspect of an exemplary embodiment, there is provided a wireless communication method performed by a user terminal (e.g., user equipment (UE)). The method may include: receiving first and second control signals from first and second user terminals through first and second control channels, respectively; estimating an interference in a first data channel, corresponding to the first control signal or the first control channel, based on the first and the second control signals; receiving a first data signal from the first user terminal through the first data channel; and processing the received first data signal based on a result of the estimation.

According to an aspect of an exemplary embodiment, there is provided a wireless communication method performed by a user terminal such as UE. The method may include: receiving a first control signal from a first user terminal through a first control channel; based on the first control signal, generating a second control signal comprising information about a second data channel, with a second user terminal, which is scheduled such that an interference with a first data channel corresponding to the first control signal or the first control channel is decreased; and transmitting the second control signal to the second user terminal through a second control channel with the second user terminal.

According to an aspect of an exemplary embodiment, there is provided a wireless communication method performed by a user terminal such as UE. The method may include: obtaining at least one control signal from at least one user terminal through at least one control channel; estimating an interference in a first data channel with a first user terminal, among the at least one user terminal, based on the at least one control signal; and processing a first data signal received through the first data channel based on the estimated interference.

According to an aspect of an exemplary embodiment, there is provided an apparatus including: a processor; and a memory accessed by the processor and configured to store a plurality of instructions executed by the processor to perform the above wireless communication method.

BRIEF DESCRIPTION OF THE DRAWINGS

Exemplary embodiments of the inventive concept will be more clearly understood from the following detailed description taken in conjunction with the accompanying drawings, in which:

FIG. 13 is a flowchart of an example of operation S400' of FIG. 12, according to an exemplary embodiment;

FIG. 14A illustrates pseudo code indicating an example of operation S420 of FIG. 13, according to an exemplary embodiment;

FIG. 14B is a table illustrating examples of combinations according to the pseudo code of FIG. 14A, according to an exemplary embodiment;

DETAILED DESCRIPTION OF THE EXEMPLARY EMBODIMENTS

Figure 1:
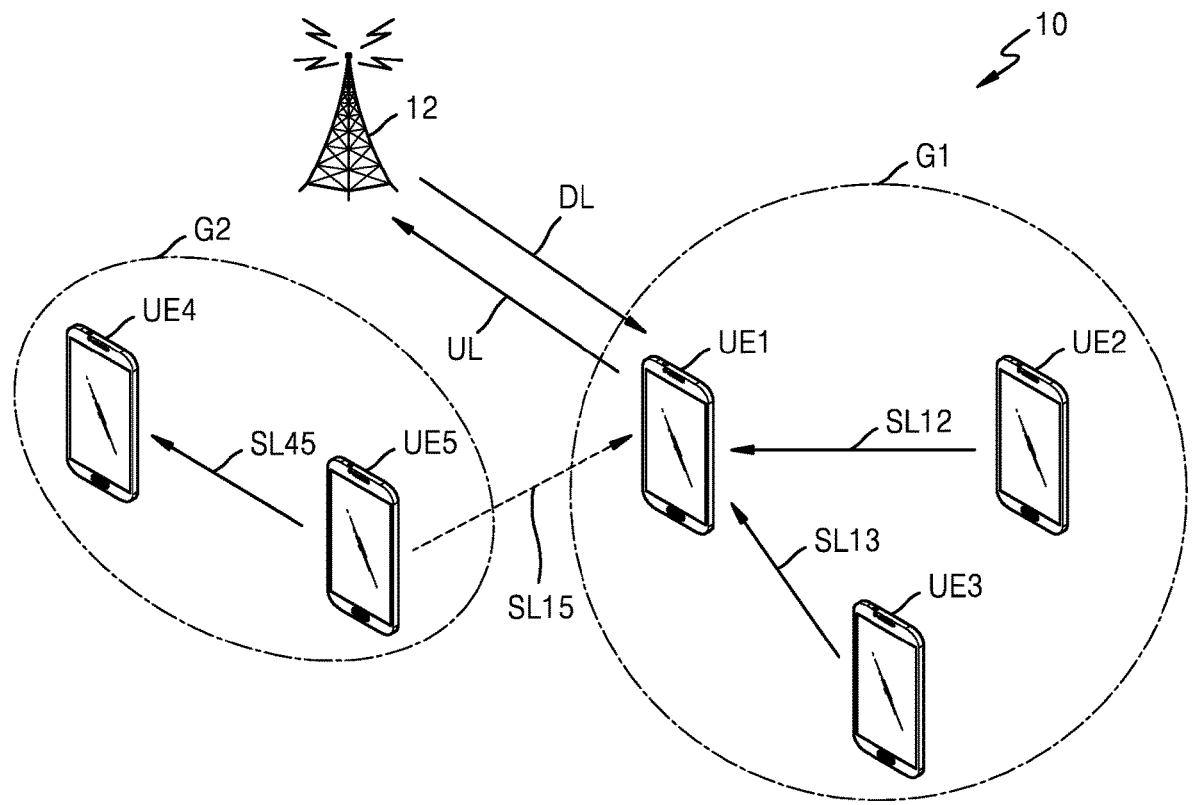
FIG. 1 is a block diagram of a wireless communication system including multiple pieces of user equipment and a base station, according to an exemplary embodiment.

FIG. 1 is a block diagram of a wireless communication system 10 including multiple pieces of user equipment (UE) and a base station (BS) 12, according to an exemplary embodiment. As a non-limiting example, the wireless communication system 10 may be a Long Term Evolution (LTE) system, a Code Division Multiple Access (CDMA) system, a Global System for Mobile Communication (GSM) system, a Wireless Local Area Network (WLAN) system, or another arbitrary wireless communication system. Hereinafter, the wireless communication system 10 will be mainly described as an LTE system, but one or more embodiments of the inventive concept are not limited thereto. The term UE may be interchangeably used with a term such as a user terminal, a mobile station, mobile device, etc.

In general, the BS 12 may be a fixed station communicating with UE and/or another BS, and as the BS 12 communicates with the UE and/or the other BS, the BS 12 may exchange data and control information with the UE and/or the other BS. For example, the BS 12 may be referred to as a Node B, an evolved-Node B (eNB), a sector, a site, a Base Transceiver System (BTS), an Access Point (AP), a relay node, a Remote Radio Head (RRH), a Radio Unit (RU), a small cell, or the like. In the present specification, the BS 12 or a cell may be understood, in a broad sense, as a function or an area covered by a Base Station Controller (BSC) in CDMA, a Node-B in WCDMA, an eNB or a sector (site) in LTE, and may include a mega cell, a macro cell, a micro cell, a picocell, a femtocell, as well as various coverage areas, e.g., coverage ranges of a relay node, an RRH, an RU, and a small cell.

First user equipment UE1 to fifth user equipment UE5 are wireless communication devices that are at fixed locations or portable, and may denote various devices capable of receiving and transmitting data and/or control information from and to the BS 12 by communicating with the BS 12. For example, the first user equipment UE1 to the fifth user equipment UE5 may each be referred to as terminal equipment, a Mobile Station (MS), a Mobile Terminal (MT), a User Terminal (UT), a Subscriber Station (SS), a wireless device, a handheld device, or the like.

A wireless communication network among the first user equipment UE1 to the fifth user equipment UE5 and the BS 12 may support communication between users by allowing available network resources to be shared. For example, via a wireless communication network, information may be transmitted in various multiple access manners such as CDMA, Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, and OFDM-CDMA.

As illustrated in FIG. 1, the first user equipment UE1 and the BS 12 may communicate with each other through an uplink (UL) and a downlink (DL). In a wireless system, e.g., an LTE system and an LTE-Advanced system, the UL and the DL may transmit control information through control channels, e.g., a Physical Downlink Control Channel (PDCCH), a Physical Control Format Indicator Channel (PCFICH), a Physical Hybrid ARQ Indicator Channel (PHICH), a Physical Uplink Control Channel (PUCCH), an Enhanced Physical Downlink Control Channel (EPDCCH), etc., or may transmit data through data channels, e.g., a Physical Downlink Shared Channel (PDSCH), a Physical Uplink Shared Channel (PUSCH), etc.

The first user equipment UE1 and the second user equipment UE2 may communicate with each other through a sidelink (SL). In a $3^{rd}$ Generation Partnership Project (3GPP) LTE, standardization of Proximity-based Service (Prose) communication has been completed as Device-to-Device (D2D) communication, in a Release 12 version. Also, standardization of enhanced D2D (eD2D) has been completed in a Release 13 version, and standardization of Vehicle-to-Vehicle (V2V) and Vehicle-to-Everything (V2X) using an SL has been completed in a Release 14 version. Referring to FIG. 1, the first user equipment UE1 to the fifth user equipment UE5 may communicate with one another through SLs. For example, the first user equipment UE1 may communicate with the second user equipment UE2 and the third user equipment UE3 through an SL12 and an SL13, respectively, when the first user equipment UE1 to the third user equipment UE3 are included in a first group G1. The SL may transmit a control signal including control information through a control channel such as Physical Sidelink Control Channel (PSCCH) (or Scheduling Assignment (SA)), and may transmit a data signal including data through a data channel such as a Physical Sidelink Shared Channel (PSSCH) (or a D2D data channel). In the present specification, receiving/transmitting signals through the PSCCH or the PSSCH may be expressed as "transmitting/receiving the PSCCH or the PSSCH".

In D2D communications, since each of the first user equipment UE1 and the second user equipment UE2 may independently generate a D2D transmission, an interference in transmissions may occur. For example, a D2D transmission from the second user equipment UE2 to the first user equipment UE1 through the SL12 may interfere in a D2D transmission from the third user equipment UE3, which is included in the first group G1, to the first user equipment UE1 through the SL13. Also, as indicated by a dashed line SL15 in FIG. 1, the D2D transmission from the second user equipment UE2 to the first user equipment UE1 through the SL12 may be interfered by a D2D transmission from the fifth user equipment UE5 to the fourth user equipment UE4 through an SL45 when the fifth user equipment UE5 is included in a second group G2. In the LTE system, D2D communications define Mode 1, in which radio resources are determined by the BS12, and Mode 2 in which radio resources are determined by each of the first user equipment UE1 to the fifth user equipment UE5. In Mode 1, an interference in D2D transmissions may be relatively weak, but may not be avoided. In Mode 2, an interference may frequently occur due to independent assignment of resources of the first user equipment UE1 to the fifth user equipment UE5. Other than Mode 1 and Mode 2, the D2D communications in the LTE system may additionally define Mode 3 and Mode 4 in V2X.

As will be described below, in some exemplary embodiments, UE may estimate, predict or presume an interference in a PSSCH based on at least one PSCCH received from at least one UE, and may process the PSSCH based on the estimated interference. Accordingly, a reception ratio of data in the PSSCH may increase. Also, in some exemplary embodiments, UE may schedule a PSSCH to be transmitted to another UE in such a manner that an interference with another PSSCH is reduced based on at least one PSCCH received from at least one UE. Therefore, a reception ratio of data in the PSSCH and efficiency of a D2D communication in a system like the wireless communication system 10 may increase. Hereinafter, it is assumed that a wireless communication method according to exemplary embodiments is performed by the first user equipment UE1 of FIG. 1, but it is noted that other exemplary embodiments may be performed by an arbitrary device supporting a D2D communication.

Figure 2:
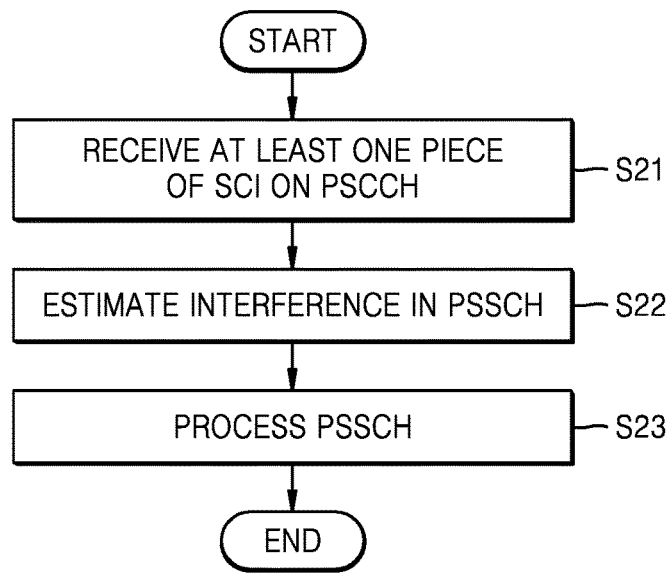
FIG. 2 is a flowchart of a wireless communication method according to an exemplary embodiment.

FIG. 2 is a flowchart of a wireless communication method according to an exemplary embodiment. For example, the wireless communication method of FIG. 2 may be performed by the first user equipment UE1 of FIG. 1, and hereinafter, the wireless communication method of FIG. 2 may be described with reference to FIG. 1.

Referring to FIG. 2, in operation S21, at least one piece of Sidelink Control information (SCI) may be received in a PSCCH. The SCI received in the PSCCH may include information about scheduling of a PSSCH to be received after reception of the PSCCH. For example, the SCI may determine a set of subframes and a set of resource blocks which are assigned to the PSSCH. Also, the SCI may include a group identifier (ID) indicating a group (e.g., the first group G1 of FIG. 1) including UE for transmitting Modulation and Coding Scheme (MCS) information and the PSCCH. Accordingly, the first user equipment UE1 may recognize, from the SCI, a resource configuration of the PSSCH to be received after the reception of the PSCCH, that is, resource blocks including data of the UE which transmitted the PSSCH in a PSSCH resource pool. The SCI will be described in detail below with reference to FIGS. 3 and 4.

In operation S22, an interference in a PSSCH may be estimated. For example, when the first user equipment UE1 receives two pieces of SCI in PSCCHs from the second user equipment UE2 and the third user equipment UE3 in operation S21, the first user equipment UE1 may estimate interferences between PSSCHs from the second user equipment UE2 and the third user equipment UE3. That is, since the first user equipment UE1 may recognize, from the two pieces of the SCI, PSSCH resource configurations of the second user equipment UE2 and the third user equipment UE3, collision blocks colliding with each other may be detected from the resource blocks including data. The first user equipment UE1 may estimate interferences in data transmissions based on the collision blocks.

In operation S23, a PSSCH may be processed. In some exemplary embodiments, the first user equipment UE1 may process a PSSCH received based on the interference estimated in operation S22. For example, the first user equipment UE1 may perform a Hybrid Automatic Repeat Request (HARQ) combining operation, based on the estimated interference. In some exemplary embodiments, the first user equipment UE1 may schedule a PSSCH to be transmitted based on the interference estimated in operation S22. For example, the first user equipment UE1 may schedule a PSSCH to be transmitted based on the estimated interference, and may transmit a PSCCH including SCI and the PSSCH according to the scheduled PSSCH.

Figure 3:
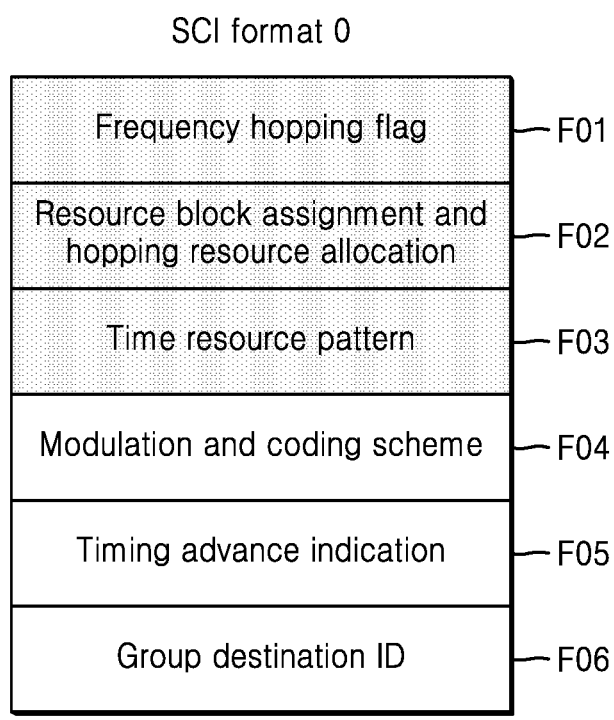
FIG. 3 illustrates an example of Sidelink Control information (SCI) included in a Physical Sidelink Control Channel (PSCCH), according to an exemplary embodiment.

FIG. 3 illustrates an example of an SCI included in a PSCCH, according to an exemplary embodiment. In detail, FIG. 3 illustrates 'SCI format 0' used in Mode 1 and Mode 2 of D2D communication.

Referring to FIG. 3, the SCI in the PSCCH may have fields, e.g., first to sixth fields F01 to F06, to include control information for a D2D communication therein. The first field F01 may be a 'Frequency hopping flag' which indicates whether frequency hopping is applied to a PSSCH. The second field F02 may be 'Resource block assignment and hopping resource allocation' which provides information about resource blocks assigned to the PSSCH. This field may also provide additional information about a frequency hopping configuration when the frequency hopping is applied. The third field F03 may be a 'Time resource pattern' which indicates subframes used in the PSSCH. The fourth field F04 may be a 'Modulation and coding scheme' which indicates modulation and coding applied to the PSSCH. The fifth field F05 may be 'Timing advance indication' which is used in Mode 1 of D2D communications, and indicates a timing adjustment value for a receiver. The sixth field F06 may be a 'Group destination ID' which indicates a group including UE transmitting the PSSCH.

A PSSCH resource configuration may be defined by the first to third fields F01 to F03 from among the above-described fields of the SCI, that is, the first to sixth fields F01 to F06. In other words, UE may recognize a subsequent PSSCH resource configuration based on the first to third fields F01 to F03 included in a SCI received through a PSCCH. Examples of the PSSCH resource configuration defined by the SCI will be described with reference to FIG. 4.

UE supporting a D2D communication may always monitor a PSCCH resource pool. UE that desires to receive a D2D transmission may attempt to receive all PSCCH resources included in the PSCCH resource pool, and may extract a group ID from the sixth field F06 of an SCI in the PSCCH that is successfully received. When the extracted group ID is associated with the UE (e.g., when the extracted group ID is the same as a group ID of the UE), the UE may process, in a manner according to the fourth field F04, resource blocks of a subsequent PSSCH according to the first to third fields F01 to F03. When the extracted group ID is not associated with the UE (e.g., when the extracted group ID is different from the group ID of the UE), the UE may not monitor a subsequent PSSCH resource pool corresponding to a PSCCH resource pool.

In some exemplary embodiments, UE may recognize a PSSCH resource configuration corresponding to a PSCCH that is irrelevant to the group ID of the UE. For example, in order to estimate an interference in a D2D transmission, the first user equipment UE1 of FIG. 1 may recognize a corresponding PSSCH resource configuration from the second user equipment UE2 and the third user equipment UE3, which is included in the same group as a group of the UE (i.e., the first group G1) and from the fifth user equipment UE5 included in a different group from the group of the UE (i.e., the second group G2). In other words, regardless of the sixth field F06 of the SCI, the UE may recognize the PSSCH resource configuration from the first to third fields F01 to F03. Also, as will be described below with reference to FIG. 10, in some exemplary embodiments, UE may use an MCS indicated by the fourth field F04 of an SCI to estimate an interference in a D2D transmission.

Figure 4:
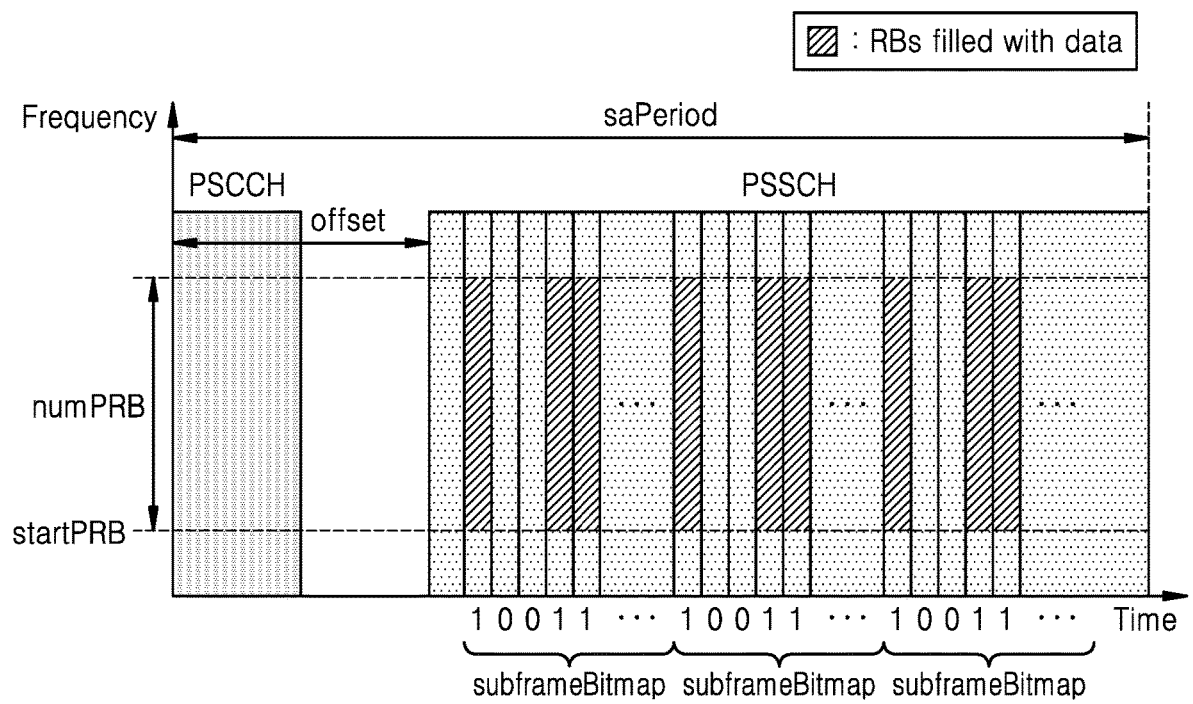
FIG. 4 illustrates an example of a PSCCH and a PSSCH, according to an exemplary embodiment.
Figure 5:
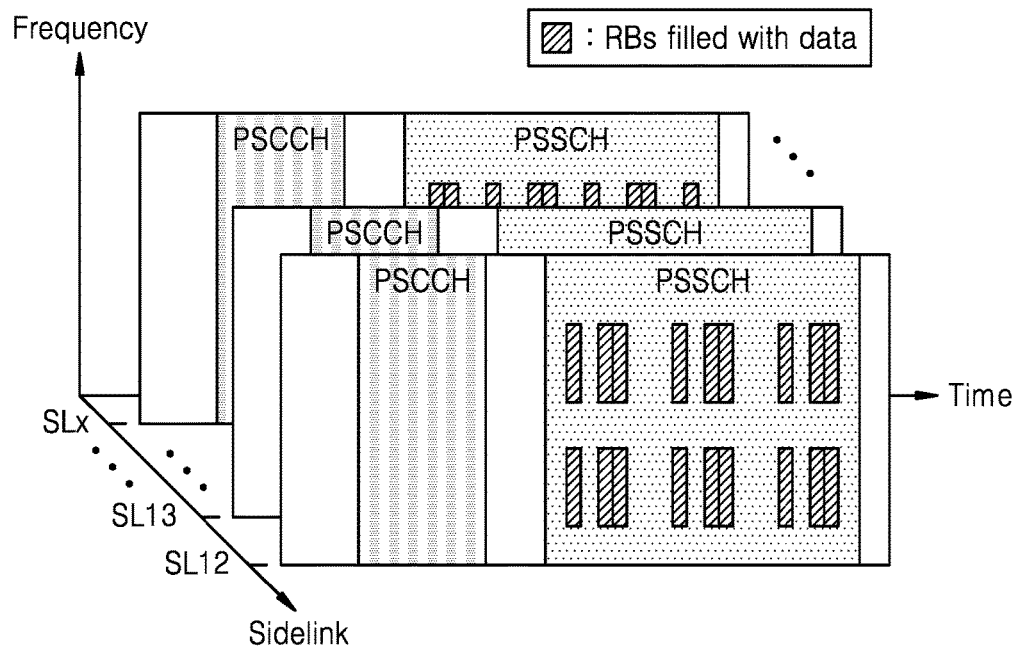
FIG. 5 illustrates resource pools of Sidelinks according to an exemplary embodiment.

FIG. 4 illustrates an example of a PSCCH and a PSSCH, according to an exemplary embodiment. FIG. 5 illustrates resource pools of SLs according to an exemplary embodiment. In detail, FIG. 4 illustrates an example of a PSCCH and a PSSCH in Mode 2 of a D2D communication, and FIG. 5 illustrates an example in which some pieces of UE of FIG. 1 simultaneously try D2D communications through SLs including the SL12 and the SL13. As described above with reference to FIG. 3, a PSCCH may define a PSSCH resource configuration. The PSSCH resource configuration of FIG. 4 is merely an example defined by the PSCCH, and it is noted that the PSSCH resource configuration may be defined by a PSCCH in a different manner from the manner of FIG. 4. Hereinafter, the exemplary embodiments of FIGS. 4 and 5 will be described with reference to FIG. 3.

Referring to FIG. 4, the PSCCH and the PSSCH may be transmitted in a certain period saPeriod. The PSCCH may be transmitted from a start point of the period saPeriod, and the PSSCH may be transmitted after a certain period of time (that is, offset) has passed from the start point of the period saPeriod. A resource pool RP, in which the PSCCH and the PSSCH are transmitted, may denote a set of resources assigned to an SL transmission, and may include subframes and resource blocks within the subframes.

The subframes used in the PSSCH may be determined by a bitmap expressed in a binary value. For example, as illustrated in FIG. 4, in a 'subframeBitmap' having a binary value, '1' may indicate a used subframe, and '0' may indicate a subframe that is not used. In the PSSCH, the 'subframeBitmap' may repeatedly appear, and accordingly, a pattern of the used subframes may be repeated. In some exemplary embodiments, the third field F03 of the SCI of FIG. 3 may include a Time Resource Pattern (TRP) index I_TRP, and a 'subframeBitmap' may be determined by the TRP index I_TRP.

In the used subframes, used resource blocks, that is, resource blocks including data, may be identified according to whether a Physical Resource Block (PRB) is assigned. For example, as illustrated in FIG. 4, a used band may be determined by a 'startPRB' and a 'numPRB'. That is, the 'startPRB' may indicate a first used resource block, and the 'numPRB' may indicate the number of used resource blocks. Accordingly, resource blocks, which are included in a band defined by the 'startPRB' and the 'numPRB' from among resource blocks included in the used subframes, may be filled with data. In some exemplary embodiments, the 'startPRB' and the 'numPRB' may be determined by the second field F02 of the SCI of FIG. 3. Although FIG. 4 illustrates only one band, two or more bands may be used. For example, an 'endPRB' may be additionally determined by the second field F02 of the SCI of FIG. 3, and a band being apart from the band of FIG. 4 may be additionally used by the 'endPRB' and the 'numPRB'.

Referring to FIG. 5, an interference in D2D transmissions may occur. For example, as illustrated in FIG. 5, a PSSCH transmitted by the second user equipment UE2 through the SL12 may interfere with a PSSCH transmitted by the third user equipment UE3 through the SL13. The interference in the PSSCHs may depend on a PSSCH resource configuration defined by a PSCCH of the SL12 and a PSSCH resource configuration defined by a PSCCH of the SL13. For example, resource blocks according to the PSSCH resource configuration of the SL12 may collide with resource blocks according to the PSSCH resource configuration of the SL13, and due to the collision, the interference may occur in the PSSCHs. Accordingly, UE may estimate the interference in the PSSCHs based on the PSSCH resource configurations recognized through the PSCCHs. Hereinafter, as will be described below with reference to the drawings, the estimated interference may be used to process a PSSCH that the UE has received, or may be used to schedule a PSSCH to be transmitted to another UE. The collision between the resource blocks of the PSSCHs will be described with reference to FIG. 7B, etc.

Figure 6:
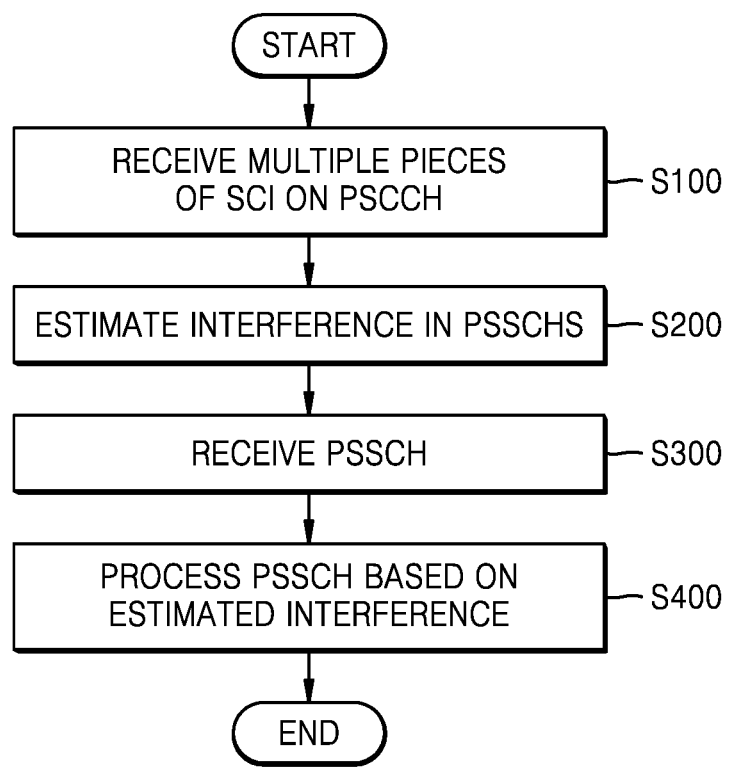
FIG. 6 is a flowchart of a wireless communication method according to an exemplary embodiment.

FIG. 6 is a flowchart of a wireless communication method according to an exemplary embodiment. In detail, FIG. 6 illustrates a method in which UE processes a received PSSCH based on an interference in PSSCHs. For example, the wireless communication method of FIG. 6 may be performed by the first user equipment UE1 of FIG. 1, and the first user equipment UE1 may process a PSSCH received from the second user equipment UE2. Hereinafter, the wireless communication method of FIG. 6 will be described with reference to FIG. 1.

Referring to FIG. 6, in operation S100, multiple pieces of SCI may be received in PSCCHs. For example, the first user equipment UE1 may receive the pieces of SCI in a PSCCH from the second user equipment UE2 and a PSCCH from the third user equipment UE3 included in the first group G1 as well as a PSCCH from the fifth user equipment UE5 included in the second group G2.

In operation S200, interferences in the PSSCHs may be estimated. For example, the first user equipment UE1 may recognize PSSCH resource configurations corresponding to the pieces of SCI, based on the pieces of SCI received in operation S100, and may estimate the interferences in the PSSCHs based on the recognized PSSCH resource configurations. Examples regarding operation S200 will be described with reference to FIGS. 7A and 7B, etc.

In operation S300, a PSSCH may be received. For example, the first user equipment UE1 may receive a PSSCH from the second user equipment UE2. In some exemplary embodiments, the first user equipment UE1 may perform operation S300 prior to operation S200, or may perform operation S200 and operation S300 in parallel.

In operation S400, a PSSCH, which is received, may be processed based on the estimated interference. For example, the first user equipment UE1 may selectively process subframes and/or resource blocks included in the PSSCH, based on the estimated interference. A detailed description of operation S400 will be provided with reference to FIG. 12, etc.

Figure 7A:
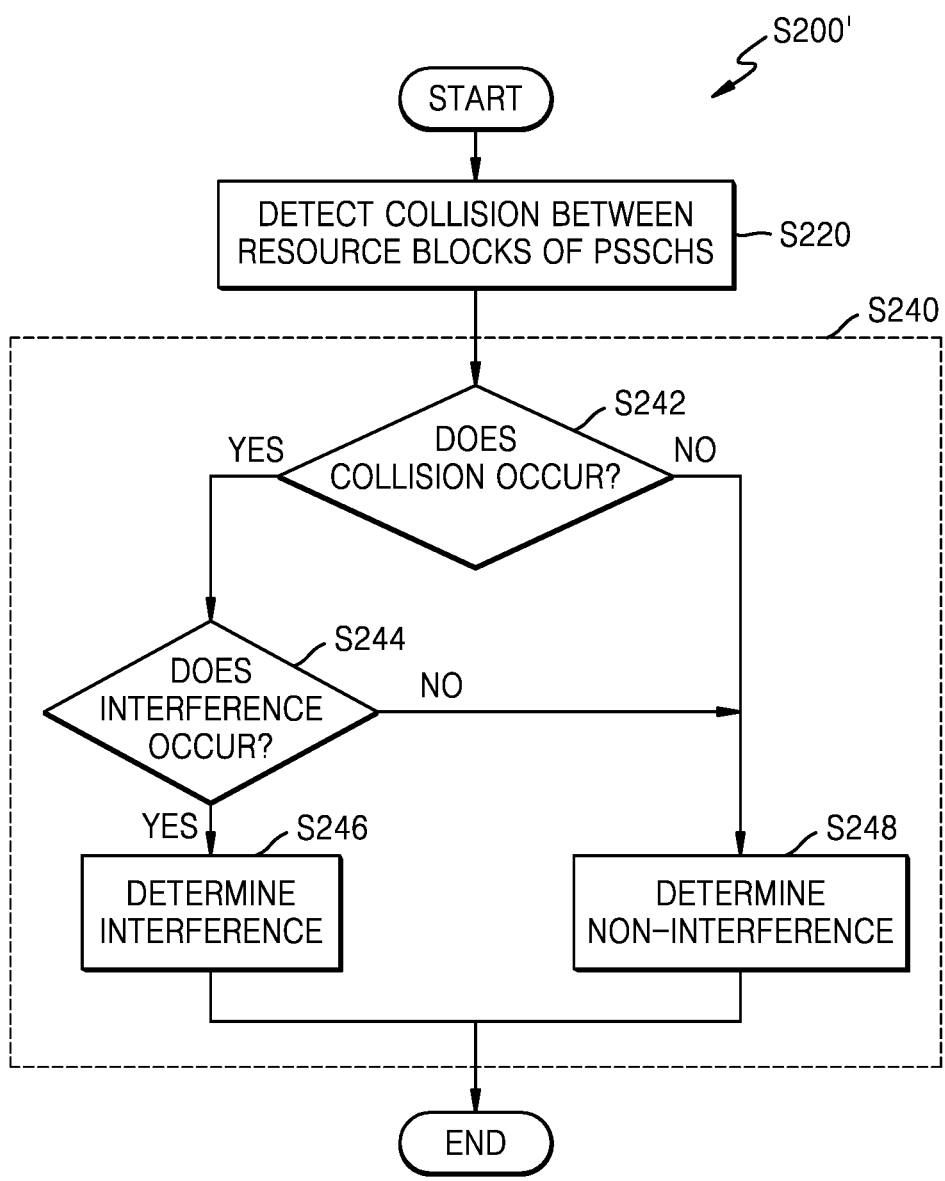
FIG. 7A is a flowchart of an example of operation S200 of FIG. 6, according to an exemplary embodiment.
Figure 7B:
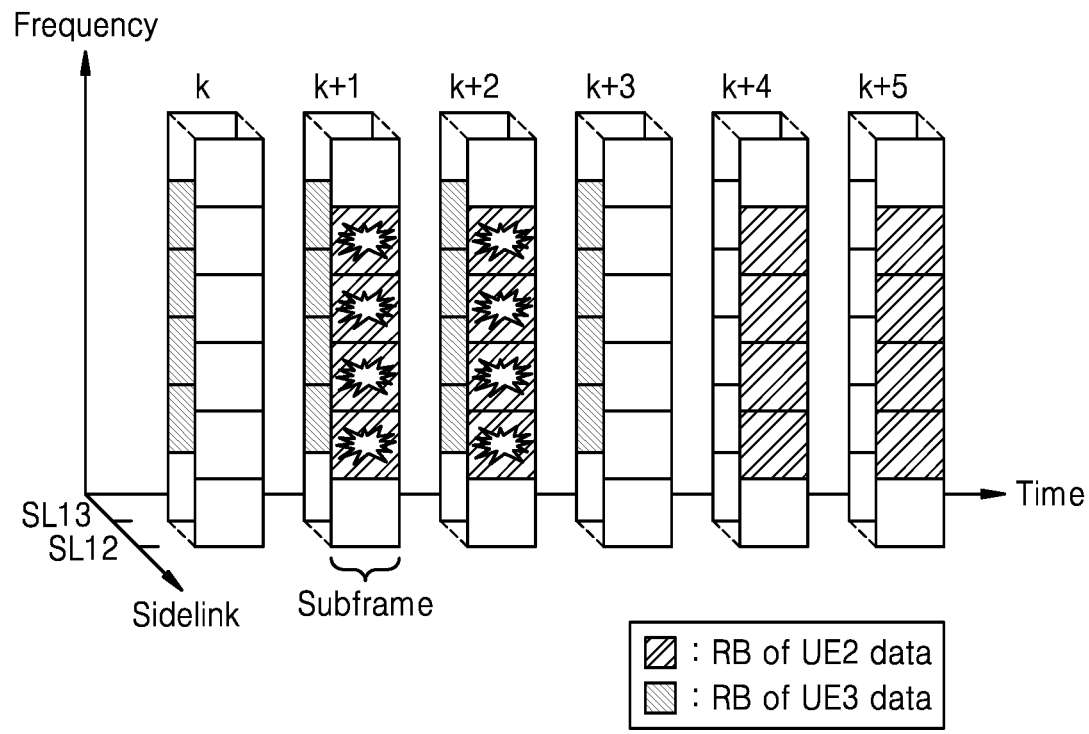
FIG. 7B illustrates an example of operation S200' of FIG. 7A, according to an exemplary embodiment.

FIG. 7A is a flowchart of an example of operation S200 of FIG. 6, according to an exemplary embodiment. FIG. 7B illustrates an example of operation S200' of FIG. 7A, according to an exemplary embodiment. As described above with reference to FIG. 6, in operation S200' of FIG. 7A, the interference in the PSSCH may be estimated. Hereinafter, the examples of FIGS. 7A and 7B will be described with reference to FIGS. 1 and 6.

Referring to FIG. 7A, in operation S220, a collision between resource blocks of PSSCHs may be detected. For example, the first user equipment UE1 may detect a collision between resource blocks of PSSCHs respectively transmitted by the second user equipment UE2 and the third user equipment UE3. As illustrated in FIG. 7B, in the SL12 and the SL13 of the second user equipment UE2 and the third user equipment UE3, the PSSCHs may include resource blocks that collide in $(k+1)^{th}$ and $(k+2)^{th}$ subframes, that is, collision resource blocks.

In operation S240, an interference or non-interference in a PSSCH may be determined based on a detected collision. For example, the first user equipment UE1 may determine whether an interference occurs in a PSSCH received from the second user equipment UE2 through the SL12. As illustrated in FIG. 7A, operation S240 may include operations S242, S244, S246 and S248.

In operation S242, whether a collision is detected in a PSSCH may be checked. For example, when a collision is detected in the PSSCH from the second user equipment UE2, operation S244 may be subsequently performed, but when a collision is not detected, it may be determined in operation S248 that an interference does not occur in the PSSCH from the second user equipment UE2.

In operation S244, whether an interference occurs in the PSSCH may be determined. For example, the first user equipment UE1 may determine whether the interference occurs in the PSSCH from the second user equipment UE2, based on information about the PSSCH from the second user equipment UE2. A detailed description of operation S244 will be provided later with reference to FIGS. 8A to 11B by describing examples of determining an interference in units of subframes. When it is determined that the interference occurs in the PSSCH from the second user equipment UE2, it may be determined in operation S246 that the interference occurs in the PSSCH from the second user equipment UE2. However, when it is determined that the interference does not occur in the PSSCH from the second user equipment UE2, it may be determined in operation S248 that the interference does not occur in the PSSCH from the second user equipment UE2. As will be described below with reference to FIG. 12, etc., the PSSCH may be processed according to the interference or non-interference in the PSSCH.

Figure 8A:
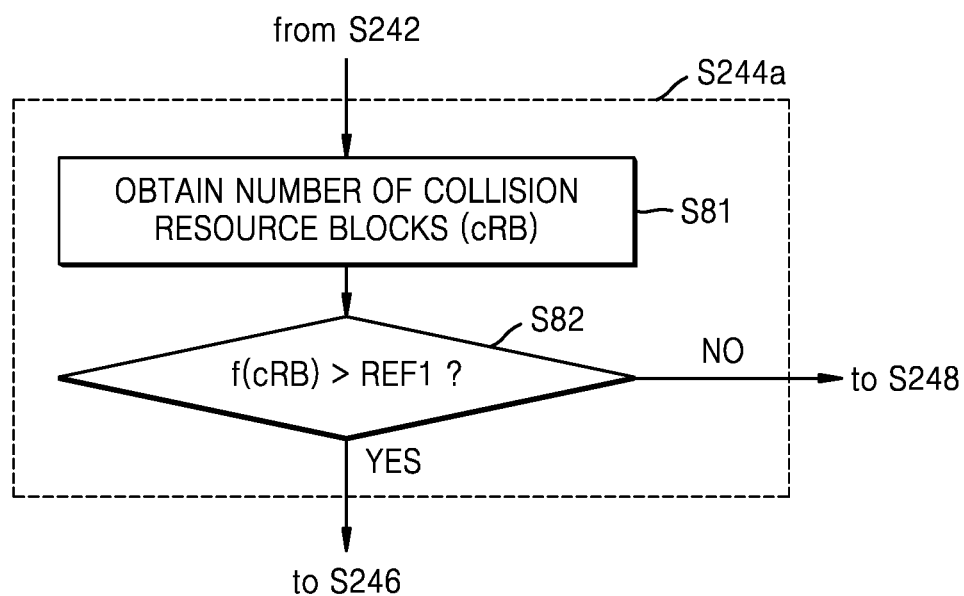
FIG. 8A is a flowchart of an example of operation S244 of FIG. 7A, according to an exemplary embodiment.
Figure 8B:
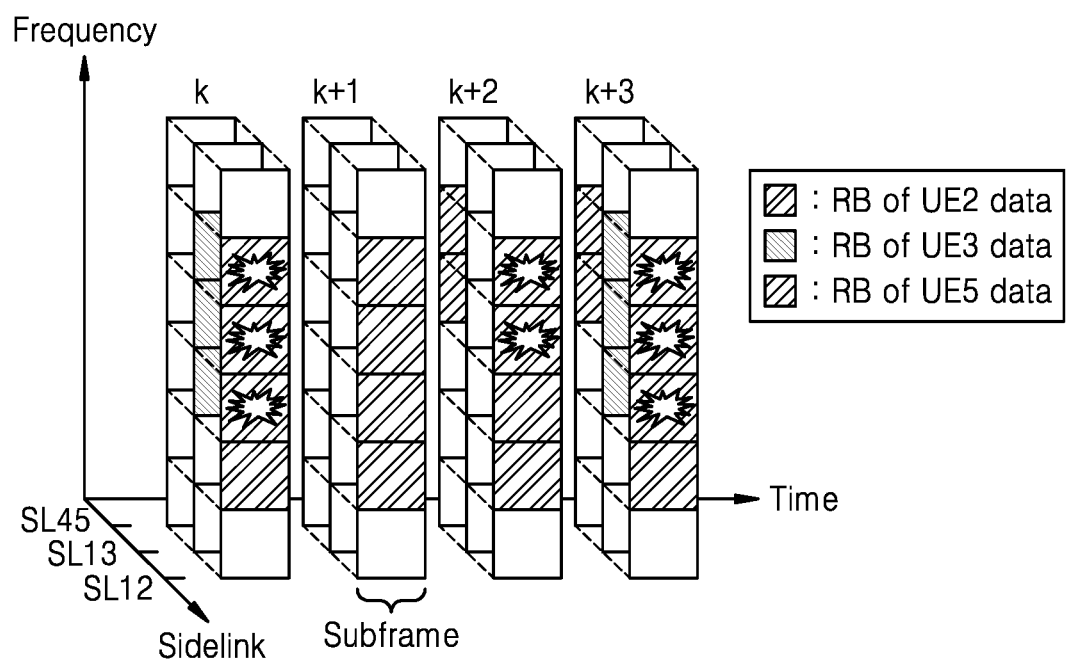
FIG. 8B illustrates an example of operation S244a of FIG. 8A, according to an exemplary embodiment.

FIG. 8A is a flowchart of an example of operation S244 of FIG. 7A, according to an exemplary embodiment. FIG. 8B illustrates an example of operation S244a of FIG. 8A, according to an exemplary embodiment. As described above with reference to FIG. 7A, whether an interference occurs in a PSSCH may be determined in operation S244a and may be determined based on the number of collision resource blocks in operation S244a. As illustrated in FIG. 8A, operation S244a may include operations S81 and S82.

In operation S81, the number of collision resource blocks cRB may be obtained. For example, as illustrated in FIG. 8B, the PSSCH of the SL12 may have three collisions in each of a $k^{th}$ subframe and a $(k+3)^{th}$ subframe, and may have two collisions in a $(k+2)^{th}$ subframe.

In operation S82, a result of a function 'ƒ(cRB)' having the number of collision resource blocks cRB as a factor is compared with a first reference value REF1. For example, the 'ƒ(cRB)' may be in proportion to the number of collision resource blocks cRB. When the 'ƒ(cRB)' is greater than the first reference value REF1, it is determined that the interference occurs in the PSSCH, and thus operation S246 of FIG. 7A may be subsequently performed. On the other hand, when the 'ƒ(cRB)' is not greater than the first reference value REF1, it is determined that the interference does not occur in the PSSCH, and thus operation S248 of FIG. 7A may be subsequently performed.

Referring to FIG. 8B, in some exemplary embodiments, the number of collision resource blocks cRB may be compared with the first reference value REF1. For example, when the first reference value REF1 equals to 2, the $k^{th}$ subframe and the $(k+3)^{th}$ subframe may be determined as having an interference, whereas the $(k+2)^{th}$ subframe may be determined as not having an interference.

In some exemplary embodiments, a ratio of the number of collision resource blocks cRB to the number of total resource blocks nRB may be compared with the first reference value REF1. For example, as illustrated in FIG. 8B, 'cRB/nRB' may be calculated in each subframe, and when the first reference value REF1 is 0.5, the $k^{th}$ subframe and the $(k+3)^{th}$ subframe may be determined as having an interference, whereas the $(k+2)^{th}$ subframe may be determined as not having an interference.

In some exemplary embodiments, a weight that is proportional to the number of collisions of resource blocks may be reflected to the 'ƒ(cRB)'. For example, as illustrated in FIG. 8B, a value, i.e., nCollision, which is the greatest among the number of collisions of the collision resource blocks included in the subframes, may be extracted, and the value may be compared with the first reference value REF1. The $k^{th}$ subframe and the $(k+3)^{th}$ subframe include the same number of collision resource blocks. The collision resource blocks included in the $(k+3)^{th}$ subframe may have the number of collisions which is greater than the collision resource blocks included in the $k^{th}$ subframe. Accordingly, due to the weight, a result of a function corresponding to the $(k+3)^{th}$ subframe may be greater than a result of a function corresponding to the $k^{th}$ subframe. Operations of determining whether an interference occurs in a PSSCH based on the number of collision resource blocks cRB are merely examples. As an interference in a PSSCH that is estimated based on the number of collision resource blocks cRB is stronger, an arbitrary function ƒ provides a greater value.

Figure 9A:
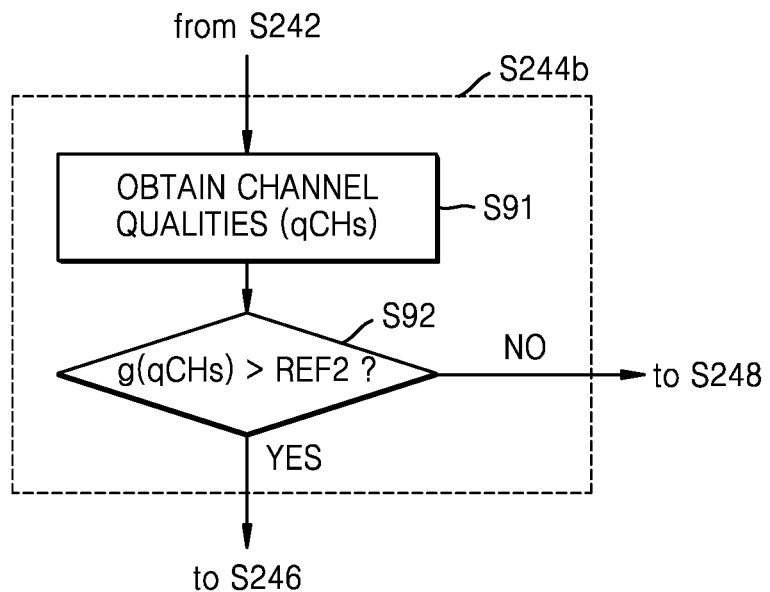
FIG. 9A is a flowchart of an example of operation S244 of FIG. 7A, according to an exemplary embodiment.
Figure 9B:
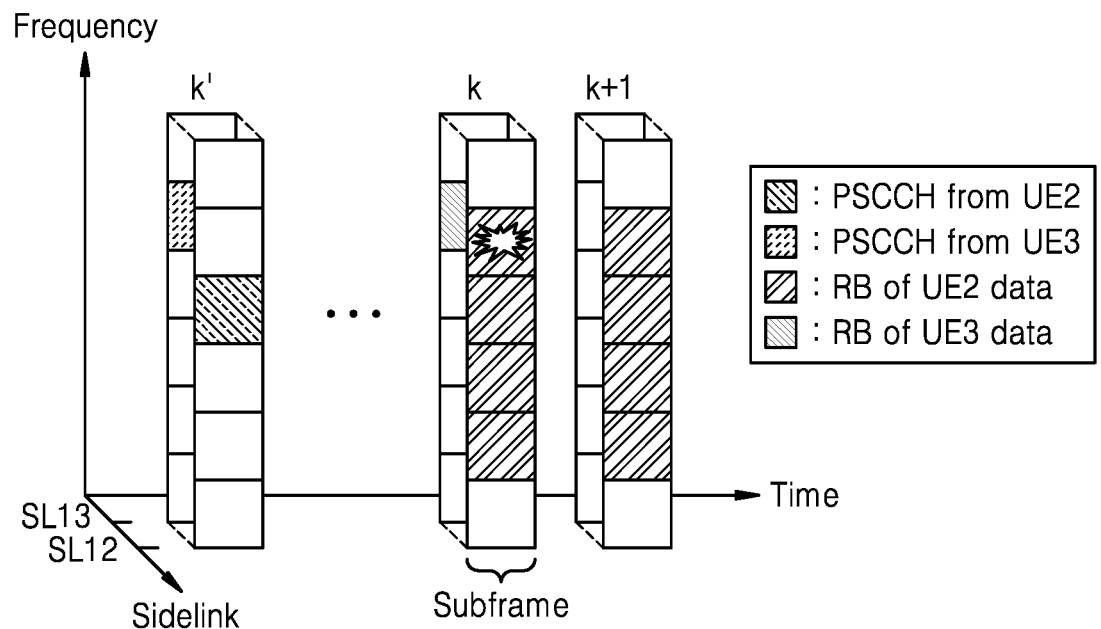
FIG. 9B illustrates an example of operation S244b of FIG. 9A, according to an exemplary embodiment.

FIG. 9A is a flowchart of an example of operation S244 of FIG. 7A, according to an exemplary embodiment. FIG. 9B illustrates an example of operation S244b of FIG. 9A, according to an exemplary embodiment. In operation S244b of FIG. 9A, occurrence of an interference in a PSSCH may be determined based on a channel quality of a D2D communication. As illustrated in FIG. 9A, operation S244b may include operations S91 and S92.

In operation S91, channel qualities qCHs may be obtained. For example, as illustrated in FIG. 9B, the first user equipment UE1 may obtain a channel quality qCH12 of the SL12 and a channel quality qCH13 of the SL13. In some exemplary embodiments, the channel qualities qCHs may be obtained from a PSCCH, for example, from a $k^{tth}$ subframe of the PSCCH. The channel qualities qCHs may be values determined based on various factors. In some exemplary embodiments, as illustrated in FIG. 9B, each of the channel qualities qCHs may be signal power of the PSCCH, and in some exemplary embodiments, each of the channel qualities qCHs may be defined based on a Signal-to-Noise ratio (SNR) of a channel, a Signal to Interference plus Noise Ratio (SINR) of a channel, or a combination thereof. Since a strong signal may be received in an SL having a high channel quality, a strong signal in an SL which is to be received may increase a reception ratio. A strong signal in another SL may cause an interference, and thus, a reception ratio may decrease.

In operation S92, a result of a function 'g(qCHs)' having the channel qualities qCHs as factors may be compared with a second reference value REF2. For example, the 'g(qCHs)' may be inversely proportional to a channel quality of an SL, and may be proportional to a channel quality of another SL. When the 'g(qCHs)' is greater than the second reference value REF2, it may be determined that the interference in the PSSCH, and thus operation S246 of FIG. 7A may be subsequently performed. On the contrary, when the 'g(qCHs)' is not greater than the second reference value REF2, it is determined that no interference occurs in the PSSCH, and thus operation S248 of FIG. 7A may be performed.

Referring to FIG. 9B, when the first user equipment UE1 desires to receive the PSSCH of the SL12, a function g' may be defined as a ratio of a channel quality qCH13 of the SL13 to a channel quality qCH12 of the SL12, and thus, the function g' may be defined as a ratio of signal power of the PSSCH from the second user equipment UE2 to signal power of the PSSCH from the third user equipment UE3. Accordingly, at the $k^{th}$ subframe of the PSSCH of the SL12, the number of collision resource blocks is merely 1, but when a value of the 'g'(qCHs)' is greater than the second reference value REF2, the $k^{th}$ subframe may be determined as an interfered subframe.

Figure 10:
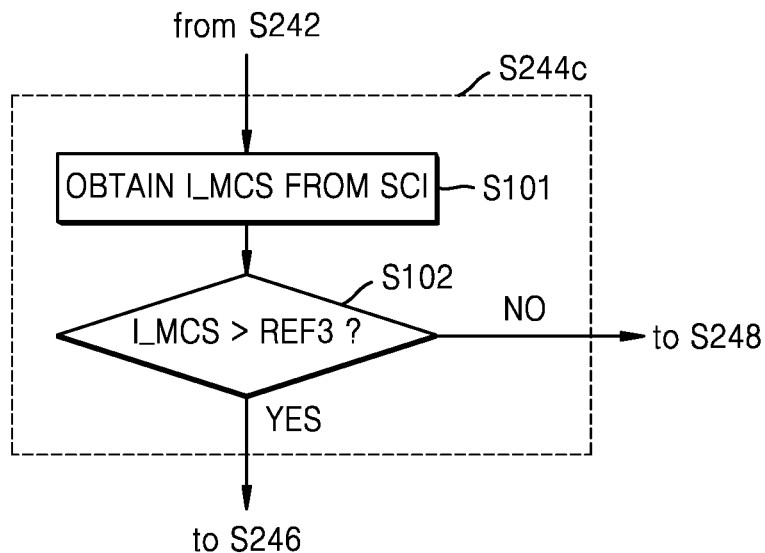
FIG. 10 is a flowchart of an example of operation S244 of FIG. 7A, according to an exemplary embodiment.

FIG. 10 is a flowchart of an example of operation S244 of FIG. 7A, according to an exemplary embodiment. In operation S244c of FIG. 10, whether an interference occurs in a PSSCH may be determined based on an MCS extracted from SCI. As illustrated in FIG. 10, operation S244c may include operations S101 and S102.

In operation S101, an MCS index I_MCS may be obtained from SCI. As described above with reference to FIG. 3, the SCI may include the fourth field F04 indicating an MCS scheme of a PSSCH, and the first user equipment UE1 may extract the MCS index I_MCS from the fourth field F04. The MCS index I_MCS may indicate an index corresponding to a modulation scheme and a coding scheme in a predefined MCS table. Referring to the MCS table, the first user equipment UE1 may recognize a modulation scheme and a coding scheme corresponding to the obtained MCS index I_MCS. A high MCS index I_MCS in the MCS table may correspond to a high modulation order.

In operation S102, the MCS index I_MCS may be compared with a third reference value REFS. For example, since a signal that is modulated by a high modulation order is highly weak to an interference, when a relatively high MCS index in a PSSCH, in which a collision is detected, is used, it may be determined that an interference occurs in the PSSCH. When the MCS index I_MCS is greater than the third reference value REF3, it is determined that an interference occurs in the PSSCH, and thus operation S246 of FIG. 7A may be subsequently performed. However, when the MCS index I_MCS is not greater than the third reference value REF3, it is determined that no interference occurs in the PSSCH, and thus operation S248 of FIG. 7A may be subsequently performed.

Figure 11A:
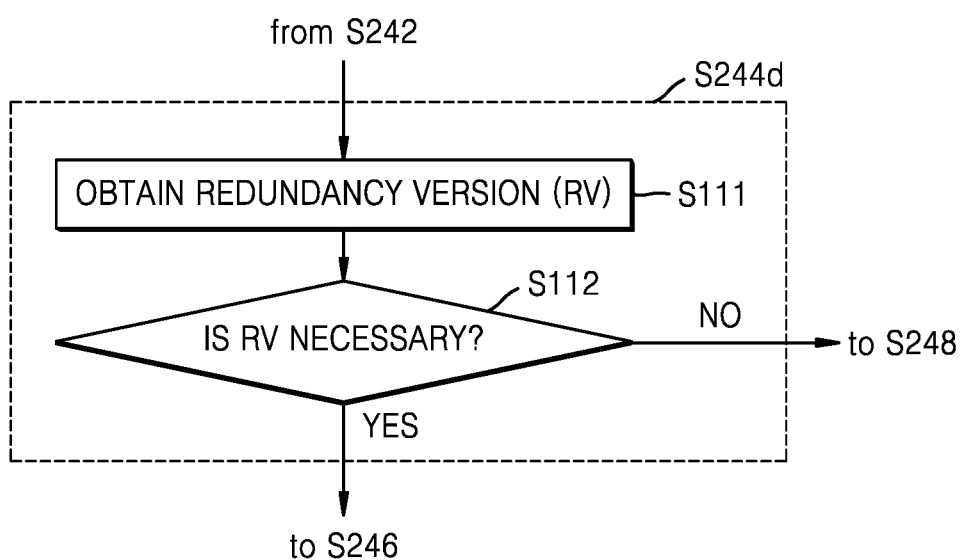
FIG. 11A is a flowchart of an example of operation S244 of FIG. 7A, according to an exemplary embodiment.
Figure 11B:
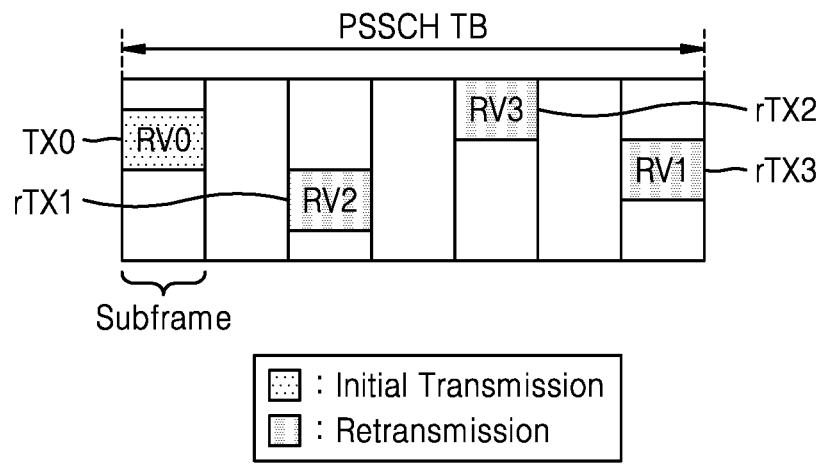
FIG. 11B illustrates an example of a transmission block of a PSSCH, according to an exemplary embodiment.

FIG. 11A is a flowchart of an example of operation S244 of FIG. 7A, according to an exemplary embodiment. FIG. 11B illustrates an example of a transmission block (TB) of a PSSCH, according to an exemplary embodiment. In operation S244d of FIG. 11A, whether an interference occurs in a PSSCH may be determined based on a redundancy version (RV). As illustrated in FIG. 11A, operation S244d may include operations S111 and S112.

In operation S111, an RV may be obtained. For example, as illustrated in FIG. 11B, the first user equipment UE1 may extract, from a PSSCH, a TB including subframes and resource blocks. In a D2D communication (or an SL communication), since a receiver does not provide a feedback regarding reception to a transmitter, the transmitter may generate an initial transmission and three retransmissions, and the receiver may combine the initial transmission and the retransmissions. In the present specification, combining the received transmissions, e.g., the initial transmission and the retransmissions, may be combining resource blocks included in each of the received transmissions. In some exemplary embodiments, the transmissions may have different RVs. That is, based on an Incremental Redundancy (IR) where retransmitted bits do not match with originally transmitted bits, the received initial transmission and the received retransmissions may be selectively combined. For example, as illustrated in FIG. 11B, a redundancy version 0 (RV0) may be applied to an initial transmission TX0, and an RV2, an RV3 and an RV1 may be sequentially applied to the first to third retransmissions rTX1 to rTX3, respectively. When RVs are applied to four sequential transmissions, i.e., the initial transmission TX0 and the first to third retransmissions rTX1 to rTX3, in a fixed order, obtaining an RV may be referred to as obtaining ordinal numbers of the transmissions TX0 and rTX1 to rTX3.

In operation S112, necessity of the RV may be determined. For example, in a D2D communication, different RVs may have the same MCS, but may correspond to different portions of encoded data. Accordingly, each of the received transmissions TX0 and rTX1 to rTX3 having different RVs includes collision resource blocks, but when the received transmissions TX0 and rTX1 to rTX3 correspond to portions of data, which are necessary for decoding, the transmissions TX0 and rTX1 to rTX3 may be combined. In some exemplary embodiments, the first user equipment UE1 may recognize a portion of data necessary for decoding according to whether at least one transmission, which is previously received, has collided with another transmission, and an RV, and the first user equipment UE1 may determine whether to combine a currently received transmission with another transmission, based on occurrence of a collision of the currently received transmission and an RV. When it is determined that the obtained RV is necessary, operation S246 of FIG. 7A is subsequently performed such that a transmission may be determined as an interference transmission. On the contrary, when the obtained RV is not necessary, operation S248 of FIG. 7B is subsequently performed such that the transmission may be determined as a non-interference transmission.

The examples of operation S244 of FIG. 7A, in which whether an interference occurs in a PSSCH is determined, have been described so far with reference to FIGS. 8A to 11B. However, it may be understood that a combination of one or more the above examples may be used to determine the interference in the PSSCH, or methods different from the above examples may be used.

Figure 12:
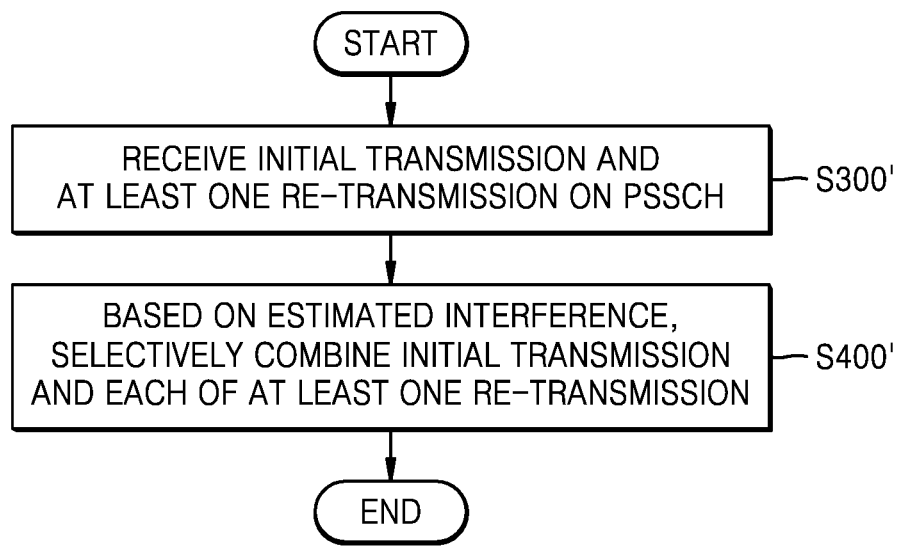
FIG. 12 is a flowchart of examples of operations of FIG. 6 according to an exemplary embodiment.

FIG. 12 is a flowchart of examples of operations S300 and S400 of FIG. 6, according to an exemplary embodiment. As described above with reference to FIG. 6, a PSSCH may be received in operation S300' of FIG. 12 and may be processed based on an interference in operation S400' of FIG. 12.

Referring to FIG. 12, in operation S300', an initial transmission and at least one retransmission may be received in a PSSCH. For example, as described above with reference to FIG. 11B, the initial transmission TX0 and the first to third retransmissions rTX1 to rTX3 may be received in the PSSCH. In some exemplary embodiments, in operation S200 of FIG. 6, an interference in each of the initial transmission TX0 and the first to third retransmissions rTX1 to rTX3 may be estimated.

In operation S400', based on estimation of an interference, the received initial transmission and at least one retransmission may be selectively combined. For example, the received initial transmission TX0 and first to third retransmissions rTX1 to rTX3 of FIG. 11B may be selectively combined, depending on occurrence of an interference. In some exemplary embodiments, the transmissions in which no interference occurs may only be combined, but in other exemplary embodiments, interference transmissions may also be combined, depending on conditions.

Regardless of the occurrence of an interference in transmissions, when demodulation and/or decoding is performed by combining the received initial transmission TX0 and all of the received first to third retransmissions rTX1 to rTX3, performance of demodulation and/or decoding may degrade due to a combination with a transmission in which an interference occurs. For example, in the example of FIG. 7B, the $(k+1)^{th}$ and $(k+2)^{th}$ subframes including the collision resource blocks from among the subframes received from the second user equipment UE2 through the SL12 may degrade performance of demodulation and/or decoding due to the combination.

It may not be easy to accurately estimate an interference in PSSCHs due to a channel quality. For example, since a Demodulation Reference Signal (DMRS) of a PSSCH is relatively simply determined, a possibility that the same DMRS is found in PSSCHs transmitted from two or more pieces of user equipment may be relatively high. Accordingly, although a channel quality of a PSSCH, for example, an SINR thereof, is high, an interference in a PSSCH having a resource configuration defined by a PSCCH is not always weak. Therefore, as described above with reference to the attached drawings, a PSSCH resource configuration is recognized from SCI, and a collision between resource blocks of a PSSCH is detected based on the PSSCH resource configuration, thereby detecting an interference in the PSSCH at an improved accuracy. As a result, based on the detected interference, a reception ratio may be improved by selectively combining a plurality of received transmissions.

FIG. 13 is a flowchart of an example of operation S400' of FIG. 12, according to an exemplary embodiment. As described above with reference to FIG. 12, in operation S400" of FIG. 13, the initial transmission and each of the at least one retransmission may be selectively combined.

Referring to FIG. 13, operation S400" may include operations S420 and S440. In operation S420, the received transmissions are combined according to predetermined conditions. In some exemplary embodiments, transmissions in which no interference occurs (or interference is not estimated or non-interference transmissions) may only be combined. In other exemplary embodiments, transmissions in which no interference occurs are combined, and transmissions in which interference occurs (is estimated) may be combined only when the transmissions satisfy the predetermined conditions. Examples of operation S420 will be described later with reference to FIGS. 14A and 14B. After operation S420 is performed, demodulation and/or decoding may be performed in operation S440.

FIG. 14A illustrates a pseudo code indicating an example of operation S420 of FIG. 13, according to an exemplary embodiment. FIG. 14B is a table illustrating examples of combinations according to the pseudo code of FIG. 14A, according to an exemplary embodiment. As described above with reference to FIG. 13, transmissions received according to the pseudo code (S420') of FIG. 14A may be combined according to the predetermined conditions. In the table of FIG. 14B, 'N' indicates non-interference, 'I' indicates an interference, and groups of transmissions which are combined with one other are shown in each case.

Referring to FIG. 14A, in lines 11 to 13, an initial transmission may be processed. The initial transmission may be regarded as a new transmission, regardless of occurrence of an interference. That is, a combination of the initial transmission with other transmissions may be determined according to whether an interference occurs in the initial transmission, and according to transmissions subsequently received.

In lines 14 to 22, a first or second retransmission may be processed. In line 15, existence of a transmission, in which an interference does not occur, before the first or second retransmission may be checked. When such a non-interference transmission exists before the first or second retransmission, the first or second retransmission in which an interference occurs may not be combined (line 16), but the first or second retransmission in which an interference does not occur may be combined (line 17). On the other hand, when a transmission, in which an interference does not occur, does not exist before the first or second retransmission, that is, when an interference occurs in all transmissions before the first or second retransmission, the first or second retransmission in which an interference occurs may be combined (line 20), while the first or second retransmission in which an interference does not occur may be regarded as a new transmission. The first or second retransmission being regarded as a new transmission is combined with a transmission to be subsequently received, instead of a previously received transmission.

In lines 23 to 29, a third retransmission may be processed. In line 24, existence of a transmission in which an interference does not occur before the third retransmission may be checked, and when such a non-interference transmission exists, this non-interference transmission may be combined with the third retransmission (line 24). On the other hand, when a transmission in which an interference does not occur before the third retransmission does not exist, that is, when an interference occurs in all transmissions before the third retransmission, the third retransmission in which an interference occurs may be combined (line 26), while the third retransmission in which an interference does not occur may be regarded as a new transmission. The third retransmission being regarded as a new transmission may be independently decoded, instead of being combined with previously received transmissions.

Referring to FIG. 14B, transmissions estimated as non-interference N may be combined, and some of transmissions estimated as interference I may also be combined. For example, all third retransmissions rTX3 may be used for decoding, and when an interference occurs in the initial transmission TX0 and the first and second retransmissions rTX1 and rTX2 (T15), the initial transmission TX0 and the first and second retransmissions rTX1 and rTX2 may be independently demodulated and/or decoded, and in other cases, may be combined with at least one previously received transmission. In addition, when an interference occurs in all of the initial transmission TX0 and the first to third retransmissions rTX1 to rTX3 (T16), since it may be more advantageous to combine all of the initial transmission TX0 and the first to third retransmissions rTX1 to rTX3 than excluding some of the initial transmission TX0 and the first to third retransmissions rTX1 to rTX3, all of the initial transmission TX0 and the first to third retransmissions rTX1 to rTX3 may be combined. As in T09 to T15 of FIG. 14B, the first to third retransmissions rTX1 to rTX3 may be regarded as new transmissions, and thus, may be combined in a second group that is different from a first group including the initial transmission TX0. In some exemplary embodiments, when decoding is successfully performed on transmissions which have been received, e.g., when a Cyclic Redundancy Check (CRC) succeeds, a subsequently received transmission may not be processed (e.g., combined, decoded, etc.). That is, when decoding is successfully performed in the first group of FIG. 14B, the second group may not be processed. According to the examples of FIGS. 14A and 14B, conditions for combining the received transmissions are as follows.

Condition 1: When an interference occurs in all of previous transmissions and a current transmission, all of the previous transmissions are combined with the current transmission. For example, in T13 of FIG. 14B, when an interference occurs in the initial transmission TX0 and the first retransmission rTX1, the received first retransmission rTX1 may be combined with the received initial transmission TX0.

Condition 2: When an interference occurs in all of the previous transmissions, but does not occur in the current transmission, the current transmission is not combined with the previous transmissions. In other words, the current transmission is excluded from combining with the previous transmissions. For example, in T09 of FIG. 14B, when an interference occurs in the initial transmission TX0, but does not occur in the first retransmission rTX1, the first retransmission rTX1 may be combined with a subsequently received transmission instead of the initial transmission TX0.

Condition 3: When an interference does not occur in the current transmission, the current transmission is combined with at least one previous transmission in which an interference does not occur. For example, in T05 of FIG. 14B, when an interference does not occur in the initial transmission TX0 and the second retransmission rTX2, but occurs in the first retransmission rTX1, the second retransmission rTX2 may be combined with the initial transmission TX0, but the first retransmission rTX1 may be excluded from the combination.

Condition 4: The third retransmission rTX3 is combined with at least one previous transmission in which an interference does not occur. That is, in T15 and T16 of FIG. 14B, when an interference occurs in all of the initial transmission TX0 and the first and second retransmissions rTX1 and rTX2, the third retransmission rTX3 in which an interference does not occur may be independently decoded, and the third retransmission rTX3 in which an interference occurs may be combined with the initial transmission TX0 and the first and second retransmissions rTX1 and rTX2.

As a result of experiments, in a certain environment (I_MCS=27, 36 RB, SINR>25 dB, k_TRP=2), a reception ratio increases from about 55% to about 95% due to a selective combination according to the above exemplary embodiments. In addition, as a result of experiments, as the number of resource blocks that collide with one another increases, a reception ratio rapidly decreases due to an unconditional combination, but the reception ratio is substantially maintained according to a selective combination according to the above exemplary embodiments.

In some exemplary embodiments, a combination of pseudo codes is included in a combination from an initial transmission in which an interference does not occur, but when an interference does not occur in all transmissions, previous transmissions in which an interference occurs may be selectively combined. The conditions which have been described with reference to FIGS. 14A and 14B are merely examples, and other conditions for combining transmissions in which an interference occurs may be defined according to exemplary embodiments.

Figure 15:
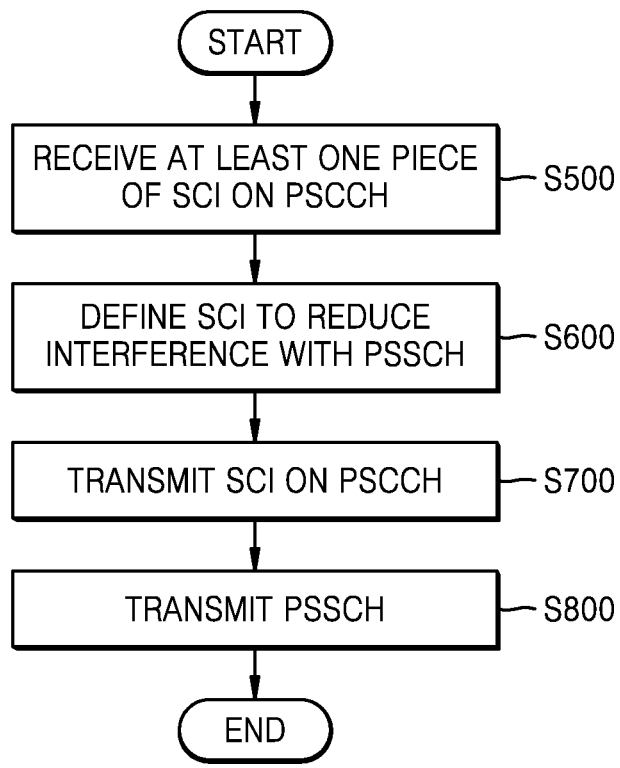
FIG. 15 is a flowchart of a wireless communication method according to an exemplary embodiment.

FIG. 15 is a flowchart of a wireless communication method according to an exemplary embodiment. In detail, FIG. 15 illustrates a wireless communication method in which UE schedules a PSSCH based on an interference in another PSSCH and transmits the same. For example, the wireless communication method of FIG. 15 may be performed by the first user equipment UE1 of FIG. 1, and the first user equipment UE1 may transmit a PSSCH to the second user equipment UE2 and/or the third user equipment UE3. Hereinafter, the wireless communication method of FIG. 15 will be described with reference to FIG. 1.

Referring to FIG. 15, in operation S500, at least one piece of SCI may be received in a PSCCH. For example, the first user equipment UE1 may receive SCI in a PSCCH from at least one of the second user equipment UE2 and the third user equipment UE3, which are included in the first group G1, and the fifth user equipment UE5 included in the second group G2.

In operation S600, SCI may be defined to decrease an interference with a PSSCH. For example, the first user equipment UE1 may recognize a PSSCH resource configuration corresponding to the received SCI based on the SCI received in operation S500, and may define SCI (or SCI for transmission) used to schedule a PSSCH, which is to be transmitted, so as to decrease an interference with the PSSCH having the recognized PSSCH resource configuration. An example of operation S600 will be described with reference to FIG. 16.

In operation S700, the SCI may be transmitted in a PSCCH. For example, the first user equipment UE1 may transmit the SCI, which is defined in operation S600, in the PSCCH. The SCI transmitted in the PSCCH may include a group ID indicating the first group G1.

In operation S800, a PSSCH may be transmitted. For example, the first user equipment UE1 may transmit the PSSCH scheduled according to the SCI defined in operation S600 and transmitted in operation S700. That is, this PSSCH may include a resource configuration defined based on the SCI transmitted in operation S700, that is, resource blocks including data of which a location is determined based on the SCI. Since the resource configuration of the PSSCH transmitted by the first user equipment UE1 is defined to decrease an interference with a PSSCH for at least another UE, a reception ratio of the PSSCH transmitted by the first user equipment UE1 at a receiver may increase.

Figure 16:
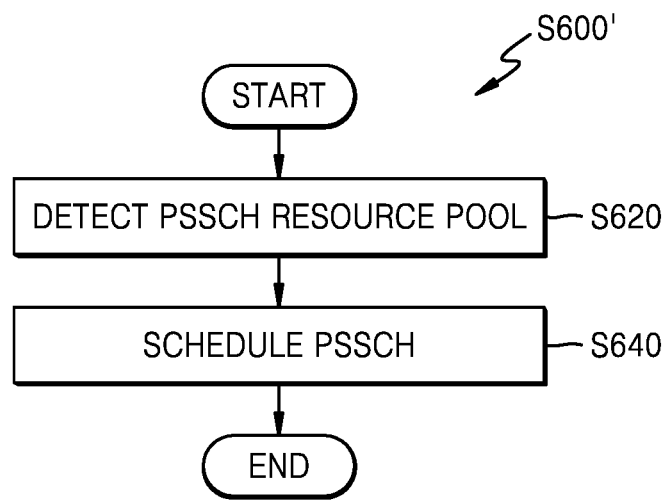
FIG. 16 is a flowchart of an example of operation S600 of FIG. 15, according to an exemplary embodiment.

FIG. 16 is a flowchart of an example of operation S600 of FIG. 15, according to an exemplary embodiment. As described above with reference to FIG. 15, in operation S600' of FIG. 16, SCI is defined to decrease an interference with a PSSCH. Hereinafter, the example of FIG. 16 will be described with reference to FIGS. 1 and 15.

In operation S620, a PSSCH resource pool may be detected. For example, based on the SCI received in operation S500 of FIG. 15, the first user equipment UE1 may detect a PSSCH resource pool or a PSSCH resource configuration corresponding to the received SCI. Accordingly, arrangement of resource blocks including data may be detected from the PSSCH.

In operation S640, a PSSCH may be scheduled. For example, the first user equipment UE1 may schedule a PSSCH, which is to be transmitted to another UE, based on the PSSCH resource pool detected in operation S620. In some exemplary embodiments, the first user equipment UE1 may schedule a PSSCH to decrease a collision with the resource blocks including the data on the detected PSSCH resource pool. In some exemplary embodiments, based on the detected PSSCH resource pool, the first user equipment UE1 may schedule a PSSCH to decrease an interference with the resource blocks that may collide with the scheduled PSSCH. Accordingly, by considering other PSSCHs, the PSSCH may be scheduled to provide an improved reception ratio. An example of operation S640 will be described with reference to FIG. 17.

Figure 17:
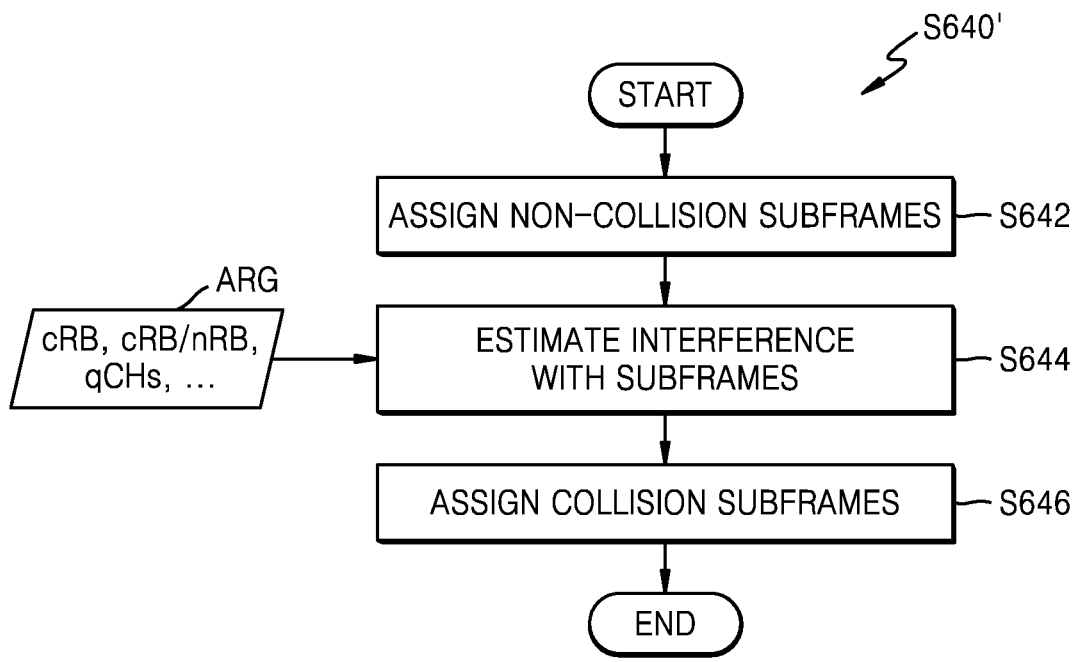
FIG. 17 is a flowchart of an example of operation S640 of FIG. 16, according to an exemplary embodiment.

FIG. 17 is a flowchart of an example of operation S640 of FIG. 16, according to an exemplary embodiment. As described above with reference to FIG. 16, in operation S640' of FIG. 17, a PSSCH to be transmitted may be scheduled, and operation S640' may include operations S642 and S644. Hereinafter, the example of FIG. 17 will be described with reference to FIGS. 1 and 16.

In operation S642, non-collision subframes may be assigned. For example, the first user equipment UE1 may determine subframes that are not used in the detected PSSCH resource pool, that is, subframes that do not include the resource blocks including the data, and may assign subframes corresponding to the detected subframes as subframes for a PSSCH to be transmitted (i.e., the non-collision subframes). Accordingly, resource blocks in the assigned subframes may not collide with other resource blocks.

In operation S644, an interference with subframes may be estimated. For example, the first user equipment UE1 may estimate an interference with the subframes used in the detected PSSCH resource pool, that is, an interference with the subframes including the resource blocks including the data. The interference with the subframes may be estimated based on at least one factor ARG, according to the exemplary embodiments described above with reference to the drawings. For example, the interference with the subframes may be estimated based on at least one of the number of collision resource blocks cRB, the ratio cRB/nRB of the number of collision resource blocks cRB to the number nRB of resource blocks in the subframes, and the channel qualities qCHs, or at least two combinations thereof.

In operation S646, collision subframes may be assigned. For example, based on the interference estimated in operation S644, the first user equipment UE1 may assign the subframes for the PSSCH to be transmitted (i.e., collision subframes) in an order of subframes providing a weaker interference. Accordingly, the PSSCH transmitted by the first user equipment UE1 may have a decreased interference with a PSSCH with respect to another UE.

Figure 18:
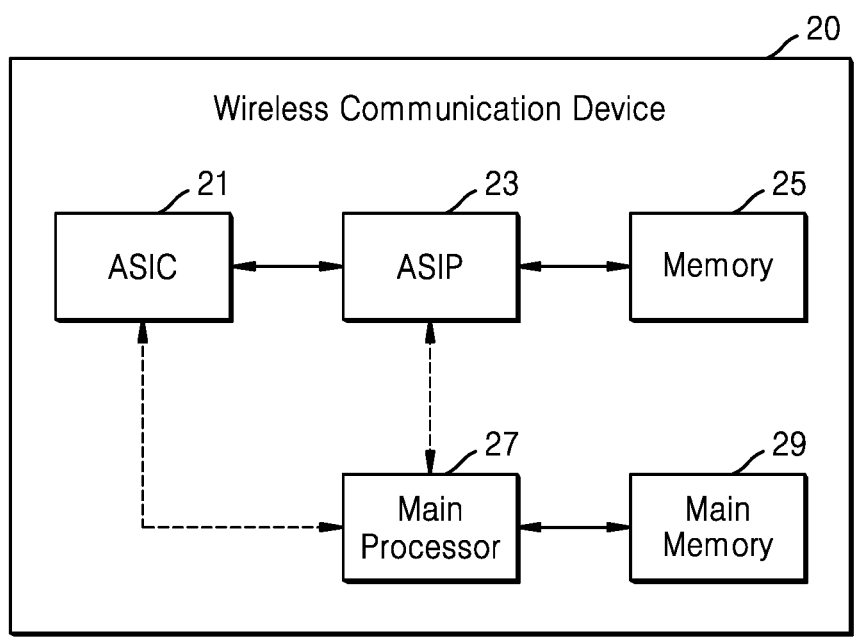
FIG. 18 is an exemplary block diagram of a wireless communication device according to an exemplary embodiment.

FIG. 18 is an exemplary block diagram of a wireless communication device 20 according to an exemplary embodiment. As illustrated in FIG. 18, the wireless communication device 20 may include an Application Specific Integrated Circuit (ASIC) 21, an Application Specific Instruction set Processor (ASIP) 23, a memory 25, a main processor 27, and a main memory 29. At least two of the ASIC 21, the ASIP 23, and the main processor 27 may communicate with each other. Also, at least two of the ASIC 21, the ASIP 23, the memory 25, the main processor 27, and the main memory 29 may be embedded in one chip.

The ASIP 23 may be a customized integrated circuit for a certain purpose, may support an instruction set only for a certain application, and may execute instructions included in the instruction set. The memory 25 may communicate with the ASIP 23 and may store instructions executed by the ASIP 23, as a non-temporary storage device. For example, as a non-limiting example, the memory 25 may include an arbitrary type of memory accessible by the ASIP 23. Examples of the arbitrary type of memory include Random Access Memory (RAM), Read Only Memory (ROM), tapes, magnetic disks, optical disks, volatile memory, non-volatile memory, and a combination thereof.

The main processor 27 may control the wireless communication device 20 by executing the instructions. For example, the main processor 27 may control the ASIC 21 and the ASIP 23 and may process data received via a wireless communication network or user inputs to the wireless communication device 20. The main memory 29 may communicate with the main processor 27 and may store instructions executed by the main processor 27 as a non-temporary storage device. For example, the main memory 29 may include an arbitrary type of memory accessible by the main processor 27, e.g., RAM, ROM, tapes, magnetic disks, optical disks, volatile memory, non-volatile memory, and a combination thereof.

The wireless communication method according to the one or more embodiments of the inventive concept may be performed by at least one of components included in the wireless communication device of FIG. 18. In some embodiments, at least one of operations of the wireless communication method may be implemented by the instructions stored in the memory 25. In some embodiments, at least one of operations of the wireless communication method may be implemented as a hardware block designed by logical synthesis, etc., and may be included in the ASIC 21. In some embodiments, at least one of operations of the wireless communication method may be implemented as instructions stored in the main memory 29, and as the main processor 27 implements the instructions stored in the main memory 29, at least one operation of the wireless communication method may be performed.

While the inventive concept has been particularly shown and described with reference to exemplary embodiments thereof, it will be understood that various changes in form and details may be made therein without departing from the spirit and scope of the following claims.

What is claimed is:

1. A wireless communication method performed by a user terminal, the method comprising:
    receiving a first control signal from a first user terminal through a first control channel and receiving a second control signal from a second user terminal through a second control channel;
    estimating an interference in a first data channel, corresponding to the first control signal or the first control channel, based on information included in each of the first and the second control signals;
    receiving a first data signal from the first user terminal through the first data channel; and
    processing the received first data signal based on a result of the estimating,
    wherein the first data channel comprises an initial transmission and at least one retransmission from the first user terminal, and
    wherein the processing the received first data signal comprises selectively combining the initial transmission and the at least one retransmission based on the estimated interference in the first data channel.

2. The wireless communication method of claim 1, wherein the estimating the interference comprises:
    detecting a collision of resource blocks of the first data channel with resource blocks of a second data channel with the second user terminal, based on the first and the second control signals, the second data channel being used to receive a second data signal from the second user terminal; and
    determining the interference in the first data channel based on the detected collision.

3. The wireless communication method of claim 2, wherein the determining the interference comprises determining the interference based on a number of collision resource blocks, among the resource blocks of the first data channel, which collide with the resource blocks of the second data channel.

4. The wireless communication method of claim 3, wherein the determining the interference comprises determining the interference based on a ratio of the number of collision resource blocks to a number of the resource blocks of the first data channel.

5. The wireless communication method of claim 2, wherein the determining the interference comprises determining the interference based on a weight that is proportional to a number of collisions at each of collision resource blocks.

6. The wireless communication method of claim 2, wherein the estimating the interference comprises obtaining a channel quality of the first control channel or the first data channel with the first user terminal and a channel quality of the second control channel or the second data channel with the second user terminal, and
- wherein the determining the interference comprises determining the interference further based on channel qualities of the first control channel or the first data channel and the second control channel or the second data channel.

7. The wireless communication method of claim 6, wherein the obtaining the channel qualities comprises obtaining signal power of the first user terminal and signal power of the second user terminal, and
- wherein the determining the interference comprises determining the interference based on a ratio of the signal power of the second user terminal to the signal power of the first user terminal.

8. The wireless communication method of claim 2, wherein the determining the interference comprises determining the interference based on a modulation and coding scheme index included in the first control signal.

9. The wireless communication method of claim 2,
- wherein the determining the interference comprises determining the interference further based on Redundancy Versions (RVs) of the initial transmission and the at least one retransmission.

10. The wireless communication method of claim 1, wherein the selectively combining comprises combining two or more, in which the interference does not occur, from among the initial transmission and the at least one retransmission.

11. The wireless communication method of claim 1, wherein the first data channel comprises the initial transmission, a first retransmission, a second retransmission, and a third retransmission which are sequentially received, and
- wherein the selectively combining comprises combining the initial transmission and the at least one retransmission further based on ordinal numbers of the first to third retransmissions.

12. The wireless communication method of claim 1, wherein the first control signal and the second control signal respectively comprise a group identifier of a group of a plurality of user terminals respectively comprising the first user terminal and the second user terminal.

13. The wireless communication method of claim 1, further comprising:
- based on the first and the second control signals, generating a third control signal used to schedule a third data signal, which is to be transmitted to a third user terminal, to decrease an interference in a third data channel transmitting the third data signal; and
- transmitting the third control signal to the third user terminal through a third control channel with the third user terminal.

* * * * *